US 6,553,417 B1

(12) United States Patent
Gampper

(10) Patent No.: US 6,553,417 B1
(45) Date of Patent: Apr. 22, 2003

(54) INTERNET DATA ACCESS ACKNOWLEDGMENT APPLET AND METHOD

(75) Inventor: James Michael Gampper, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,262

(22) Filed: Aug. 5, 1998

(51) Int. Cl.[7] ............................................. G06F 15/173
(52) U.S. Cl. .................... 709/224; 709/203; 709/219; 709/217
(58) Field of Search ................. 704/225, 226, 704/219; 705/14, 10; 709/224, 219, 225, 203, 226, 217

(56) References Cited

U.S. PATENT DOCUMENTS

| | | | |
|---|---|---|---|
| 5,550,984 A | 8/1996 | Gelb | 709/217 |
| 5,606,361 A | 2/1997 | Davidsohn et al. | 709/201 |
| 5,647,056 A | 7/1997 | Barrett et al. | 709/200 |
| 5,732,218 A * | 3/1998 | Bland et al. | 709/224 |
| 5,848,412 A * | 12/1998 | Rowland et al. | 707/9 |
| 5,918,014 A * | 6/1999 | Robinson | 395/200.49 |
| 5,918,214 A * | 6/1999 | Perkowski | 705/27 |
| 5,933,811 A * | 8/1999 | Angles et al. | 705/14 |
| 5,948,061 A * | 9/1999 | Merriman et al. | 709/219 |
| 5,950,173 A * | 9/1999 | Perkowski | 705/26 |
| 6,038,601 A * | 3/2000 | Lambert et al. | 709/226 |
| 6,052,730 A * | 4/2000 | Felciano et al. | 709/225 |
| 6,138,155 A * | 10/2000 | Davis et al. | 709/224 |

FOREIGN PATENT DOCUMENTS

| | | |
|---|---|---|
| EP | 0 771 095 A2 | 5/1997 |
| WO | WO 97/15007 | 4/1997 |
| WO | WO 97/31491 | 8/1997 |

OTHER PUBLICATIONS

"Passport File for Secure Access to the Internet", *IBM Technical Disclosure Bulletin*, 39(02):333–334 (Feb. 1996).

* cited by examiner

Primary Examiner—Moustafa M. Meky
Assistant Examiner—Abdullahi E. Salad
(74) Attorney, Agent, or Firm—Altera Law Group, LLC

(57) ABSTRACT

A method for ensuring that usage information concerning a web site or advertisement is provided to an originator of data or advertising. An applet is embedded within accessible code, the applet is executed upon access of the accessible code, returning user related information, such as the address of the user, to the originator of the accessible code. The accessible code may be an advertisement. A gathering of additional information and waiting until a triggering event occurs before returning the additional information and the identity of the user. The triggering event includes closing of data associated with the accessible code being viewed by the user or viewer movement to another space. The additional information comprises how long the space was viewed, the number of other links accessed, and the identification of other similar links accessed.

21 Claims, 5 Drawing Sheets

INTERNET DATA ACCESS ACKNOWLEDGMENT APPLET AND METHOD

BACKGROUND OF THE INVENTION

1. Field of the Invention

This invention relates in general to a method for monitoring user engagement with computer interfaces, and more particularly to an applet and method for providing acknowledgment and usage data to a data originator after a web page, an electronic advertisement or other user interface is engaged by a user.

2. Description of Related Art

As Internet-based electronic commerce begins to truly flourish, the web of connections between companies, their suppliers, partners and ultimately their customers is catapulting beyond today's mere hyperlinks. All Internet users agree that the usage of the Internet is growing on a worldwide basis. In fact, few would disagree with the view that the consolidation of worldwide networks is destined to continue. Furthermore, price reductions in telecommunications bandwidth and processing devices are continuing to incite an explosion of Internet usage.

In contrast to the current proliferation of Internet usage, the early use of the Internet was simply to have a means for the academic and government research facilities and institutions to share electronic documents and communications with each other. The content of these Internet pioneers was mostly text based information; simple e-mail, file transfers, and text based documents. However, with the developments of the World Wide Web (WWW) and graphical Internet browsers, people are able to share and exchange richly formatted electronic documents complete with graphics and hyperlinks.

This in turn led to the extension of these new information delivery vehicles beyond academia to include individual consumers and businesses. As would be expected, many visions of using the Internet for business and entertainment purposes have emerged. As the demand for the new technology has grown for both its entertainment value and as a tool for businesses, the HTML documents specification has been extended to handle different content types; including digital audio, video, distributed applications, and dynamic document generation from existing data formats and relational databases.

One of the fastest growing areas for the use of the Internet is the framing of content with advertising. Advertising is used to sell a product promoted in the advertisement to a computer user that is accessing the database providing the content. However, for such advertising data, and for some other types of information as well, it is very useful for the advertiser and/or the information provider to collect information about the people who have accessed a particular database. For example, the advertiser would find it useful to know how many people accessed the computerized database, their usage characteristics, their identity, etc.

One way the frequency of access on the Internet is determined at present is by simply counting the number of "hits" on a particular page. However, it is well known that some computers are set to automatically access a web page, for example, at a particular time each day.

In WWW terms, a cache is a place where temporary copies of objects are kept. Essentially, once a URL has been cached, subsequent requests for it will be given the cached copy. Some WWW browsers implement their own caches on disk and/or in memory. These are usually done according to schemes which are specific to the browser in question, and a cache created this way tends to be at best visible only to other users of the same browser, and at worst only visible to the user who created it.

By contrast, network cache servers provide a shared cache facility which can be accessed from the vast majority of WWW browsers. A small configuration change to the browser is usually all that is necessary to take advantage of the networked cache, and the cached information will be available to everyone who has their browser configured to use the cache server.

Caching WWW traffic offers a number of benefits, notably faster performance on cached URLs and cached resources will be available in the time taken to connect to the cache server, and have the browser's request processed. This can be very useful in situations where response times need to be kept low, such as product demonstrations and courses/tutorials. Caching WWW traffic also reduces the amount of bandwidth used and places less demand on servers. Further, frequently accessed resources may be a long distance (topologically speaking) from the user. If the resource has been cached, access to it will only incur the cost of a connection to the cache server. Finally, since requests which are satisfied from the cache will not be passed on to the remote server, the amount of work the server is required to do may be substantially reduced.

However, caching is not without problems. In particular, slower performance occurs if the object isn't cached. For example, a performance penalty is imposed when the cache server has to connect to the target server and request a copy of the resource. Caching also may cause objects sometimes get mangled. For example, if the target server becomes unreachable, or drops the connection before the object has been fully downloaded, the copy returned by the cache may be incomplete or garbled. Although there is a mechanism for refreshing the cached copy of the resource, the refresh mechanism is not universally supported. Finally, caching causes confused logging and access control. Most logging and access control is done on the basis of the requesting machine's domain name or IP address. If networked caching has been deployed, the details of the machine which is really requesting the resource will be replaced with the cache servers.

Thus, barriers, such as web caching, mask the number of accesses to data and the identity of the actual requester/receiver of data. As a result, publishers, advertisers and others who charge for or pay by the number of accesses to data cannot receive the full financial benefit because of the masking effect.

It can be seen that there is a need for a method and apparatus that unmasked a user's accessing of a web page, an electronic advertisement or other user interface.

It can also be seen that there is a need for an applet and method for providing acknowledgment and usage data to a data originator after a web page, an electronic advertisement or other user interface is engaged by a user.

SUMMARY OF THE INVENTION

To overcome the limitations in the prior art described above, and to overcome other limitations that will become apparent upon reading and understanding the present specification, the present invention discloses a method for ensuring that usage information concerning a web site or advertisement is provided to an originator of data or advertising.

The present invention solves the above-described problems by providing an applet and method for providing acknowledgment and usage data to a data originator after a web page, an electronic advertisement or other user interface is engaged by a user.

A method in accordance with the principles of the present invention includes embedding an applet within accessible code, executing the applet upon access of the accessible code, returning user related information, such as the address of the user, to the originator of the accessible code.

Other embodiments of a system in accordance with the principles of the invention may include alternative or optional additional aspects. One such aspect of the present invention is that the accessible code is an advertisement.

Another aspect of the present invention is that the method further includes gathering additional information and waiting until a triggering event occurs before returning the additional information and the identity of the user.

Another aspect of the present invention is that the triggering event includes closing of data associated with the accessible code being viewed by the user.

Another aspect of the present invention is that the triggering event includes viewer movement to another space.

Another aspect of the present invention is that the additional information includes how long the space was viewed, the number of other links accessed, and the identification of other similar links accessed.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a code, that may be referred to as an "Internet Carrier Pigeon", that is placed on the downloaded information/advertisement and is released (executed) when the page/information is viewed. The carrier pigeon "flies home" to its place of origin and can be used to let advertisers know specific users who are viewing their ads and the actual numbers of individuals as well.

Figure 1:
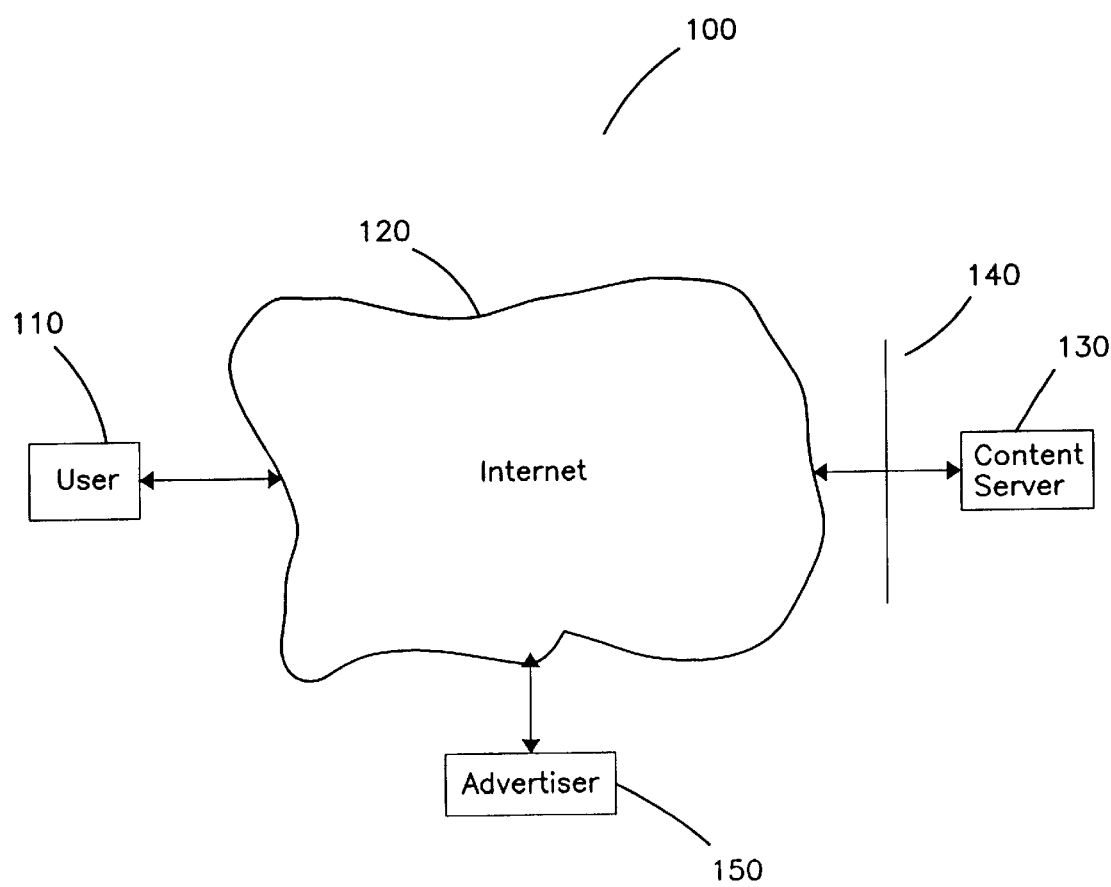
FIG. 1 illustrates an Internet network configuration.

FIG. 1 illustrates an Internet network configuration 100. In FIG. 1, a user 110 is connected to the Internet 120. Through the Internet 120, the user 110 accesses content from a content server 130. The content provided by the content server 130 may be associated with advertising paid for and provided by an advertiser 150, e.g. the content may be framed with advertisements. In addition, the content provided by the content server 130 may essentially be an advertisement.

A firewall isolates a specific segment of Internet topology, e.g., the content server 130 from the rest of the Internet and controlling all the traffic that comes to and leaves the content server 130. The content viewed by the user 110 may be cached within the Internet cloud 120. If this occurs, the content server 130 will not be able to determine how often the content from the content server is viewed or by whom.

Figure 2:
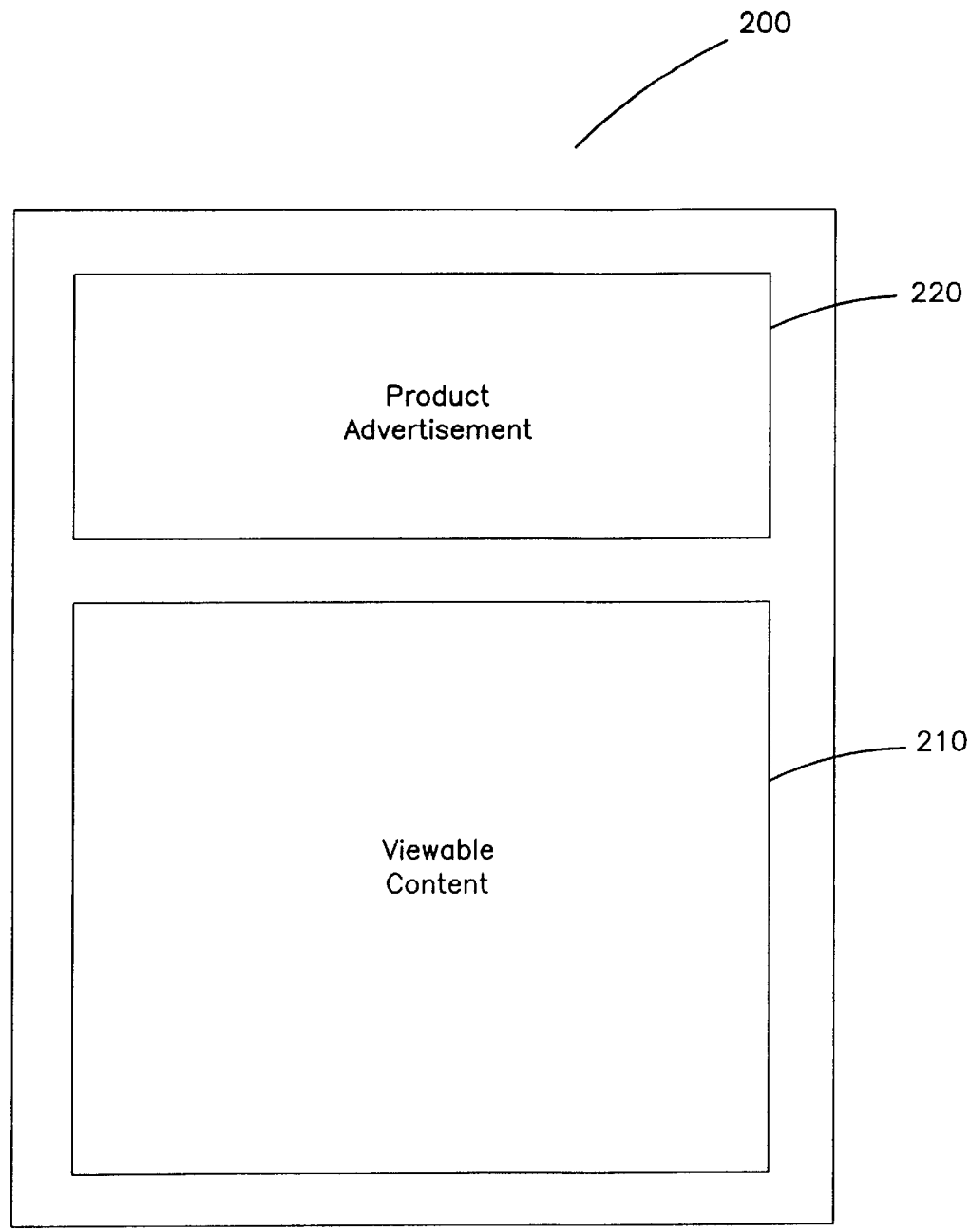
FIG. 2 is a simple diagram of a web page.

FIG. 2 is a simple diagram of a web page 200. The web page includes content 210 and a product advertisement 220. While the user is viewing the content 210, the user may be enticed to investigate the product advertisement 220. The user accesses the product advertisement 220 which causes the user to be hyperlinked to an advertiser. However, as mentioned above, the advertiser cannot identify the user or determine any demographic information based upon the user's actions since the content 210 and the advertisement 220 may be provided to the user via a cache server (not shown).

The advertisement may be provided with an applet embedded therein, in accordance with the present invention, to facilitate tracking of the actual user viewing the advertisement 220 and to provide demographics of the viewing of the advertisement 220.. An applet is a small piece of executable code which may be included in web pages or advertising frames and executed whenever triggered by the user accessing the web page or advertising frame.

While the web page 200 illustrated in FIG. 2 includes content 210 and a product advertisement 220, those skilled in the art will recognize that a web page 200 being viewed by a user may not include a product advertisement 220 via a hypertext link. Rather, the content 210 may be presented to the user via a cache server. In such an instance, the content provider can include an applet embedded in the content 210 to facilitate tracking of the actual user viewing the content 210 and to provide demographics of the viewing of the content 210. Alternatively, both the content 210 and the advertisement 220 may include an applet according to the present invention. Thus, those skilled in the art will recognize that the present invention is not meant to be limited to a particular placement of the applet, but rather an applet according to the present invention may be embedded in any viewable media so that user related data, e.g., URL address of the user and user viewing behavior, may be provided to the provider of the viewable media.

Figure 3:
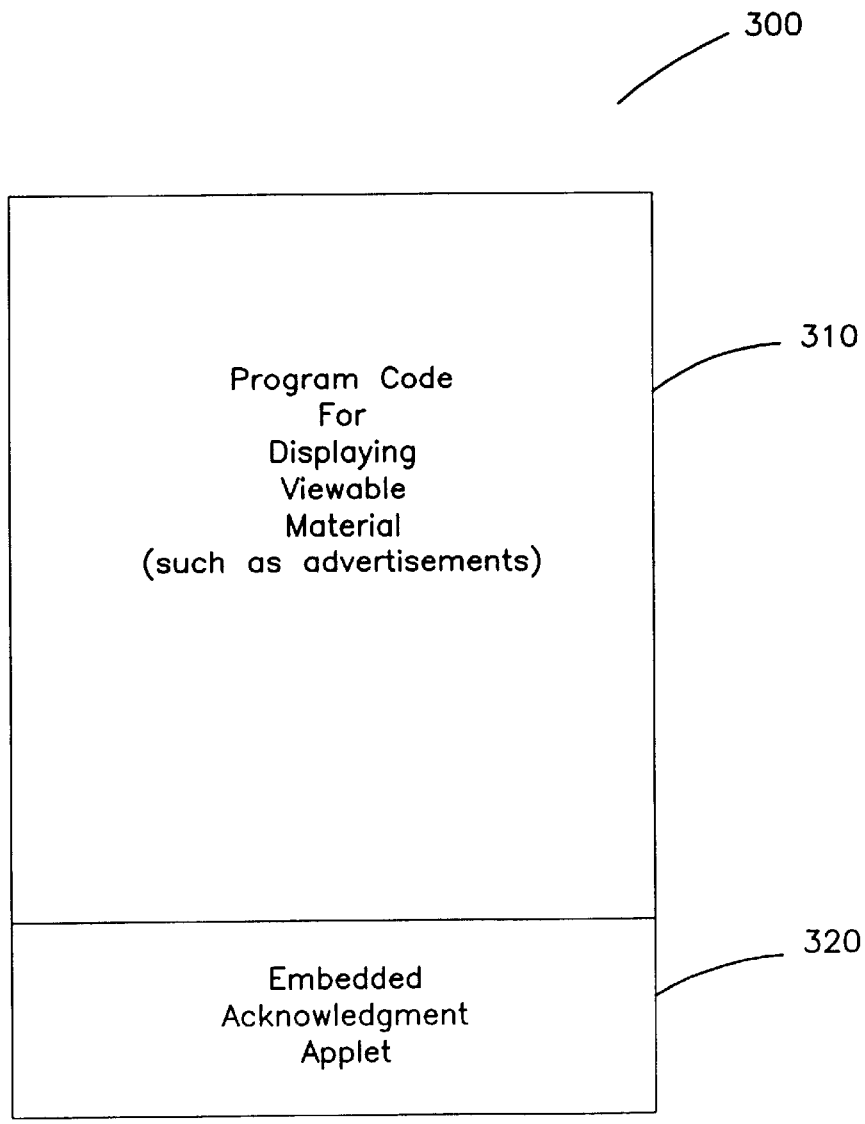
FIG. 3 illustrates a block of code 300 providing the product advertisement illustrated in FIG. 2.

FIG. 3 illustrates a block of code 300 providing the product advertisement with an embedded applet as discussed above with reference to FIG. 2. In FIG. 3, the block of code 300 include the code for the advertisement 310 as well as the embedded applet according to the present invention 320. However, as mentioned above, the applet may be placed within the content.

Figure 4:
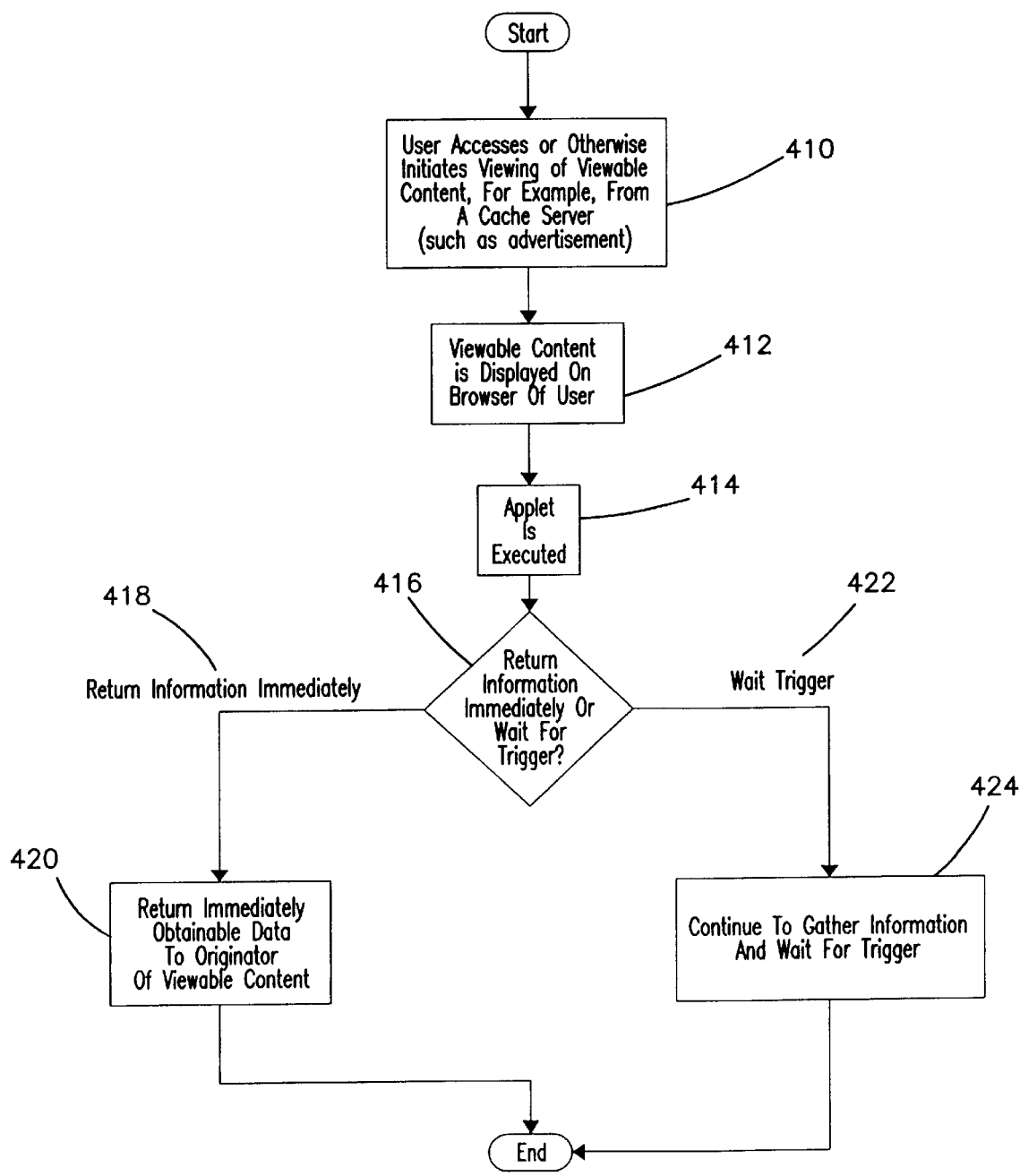
FIG. 4 illustrates the operation of the applet according to the present invention.

FIG. 4 illustrates the operation of the applet according to the present invention 400. In FIG. 4, the user accesses or otherwise initiates viewing of viewable content, such as advertising data, wherein the viewable content has an applet embedded therein according to the present invention 410. The user views the advertising data being displayed by a browser via a hyperlink to the advertisement 412. Those skilled in the art will recognize that the user may be transferred to another server containing the advertising data or the advertising data may displayed through the frame containing the link to the advertisement through a process referred to as framing. Nevertheless, upon accessing the advertising data, the applet is executed 414. At this time, the applet determines whether to return information immediately or to wait for a trigger 416. If the information is to be returned immediately 418, the immediately obtainable data, e.g., the Internet address of the viewer, is returned immediately to the originator or designee 420. Alternatively, if the applet waits for a trigger 422, the applet continues to gather additional information, e.g., how long the space was open/viewed, number of other links accessed, other similar links accessed, etc., and waits until the triggering event such as the closing of the information space or viewer movement to another space occurs 424.

Figure 5:
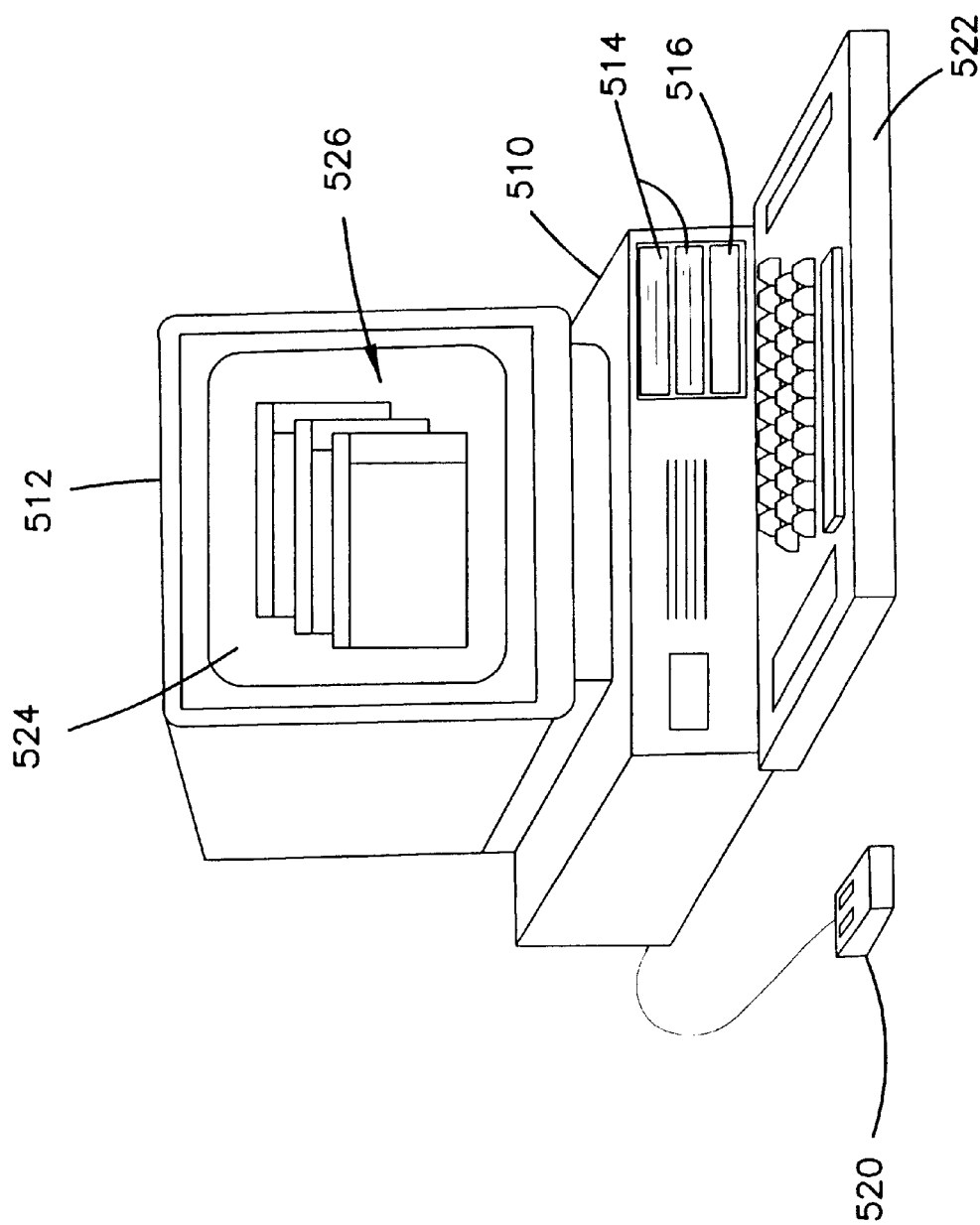
FIG. 5 is a block diagram that illustrates an exemplary hardware environment for implementing an applet according to the present invention.

FIG. 5 is a block diagram 500 that illustrates an exemplary hardware environment for implementing an applet according to the present invention. The present invention is typically implemented using a computer or server 510 comprised of a microprocessor, random access memory (RAM), read-only memory (ROM), and other components. It is envisioned that attached to the computer 510 may be a monitor 512, floppy disk drives 514, and CD-ROM drives 516. Also included in the preferred embodiment may be input devices, for example, a mouse pointing device 520 and a keyboard 522.

The computer 510 operates under the control of an operating system 524, which is represented in FIG. 5 by the screen display on the monitor 512. The computer 510 executes one or more computer programs or applets 526, which are represented in FIG. 5 by the "windows" displayed on the monitor 512, under the control of the operating system 524. The present invention comprises a method for tracking actual user viewing and demographics of advertisement viewing that is preferably implemented in the operating system 524 and/or computer programs/applets 526.

Thus, an applet according to the present invention acts as an "Internet Carrier Pigeon" by tracking actual user viewing and demographics of advertisement viewing. Moreover, the "Internet Carrier Pigeon" prevents the masking of a user or requester of data or advertising for caching, security, identification and similar purposes. Those skilled in the art will recognize that, while the invention has been explained with reference to advertisements, other embodiments in accordance with the teaching of the invention are possible.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for tracking actual user viewing and demographics of viewing, comprising embedding an applet within accessible code, executing the applet upon each access of the accessible code when the accessible code is accessible at a location other than at an originating content server, and returning user related information to the originator of the accessible code in response to each access of the accessible code, the execution of the applet and returning of user related information to the originator prevents isolation of the user from the originator of the accessible code.

2. The method of claim 1 wherein the accessible code is an advertisement.

3. The method of claim 1 further comprising gathering additional information and waiting until a triggering event occurs before returning the additional information and the identity of the user.

4. The method of claim 3 wherein the triggering event comprises closing of data associated with the accessible code being viewed by the user.

5. The method of claim 3 wherein the triggering event comprises viewer movement to another space.

6. The method of claim 3 wherein the additional information comprises a measurement of how long the space was viewed, a number of other links accessed, and an identification of other similar links accessed.

7. The method of claim 1 wherein the user related information comprises an address of the user.

8. An article of manufacture for tracking actual user viewing and demographics of viewing of data provided by a data originator, the article of manufacture comprising a computer readable medium having instructions for causing a computer to track user actions according to a method, the method comprising:

beginning execution of an applet embedded in accessible code for gathering data associated with a user upon each access of accessible code by the user when the accessible code is accessible at a location other than at an originating content server; and returning user related information to the originator, in response to each access of the accessible code, the execution of the applet and the returning of user related information to the originator prevents isolation of the user from the originator of the accessible code.

9. The article of manufacture of claim 8 wherein the data is an advertisement.

10. The article of manufacture of claim 8 further comprising gathering additional information and waiting until a triggering event occurs before returning the additional information and the identity of the user.

11. The article of manufacture of claim 10 wherein the triggering event comprises closing of the data being viewed by the user.

12. The article of manufacture of claim 10 wherein the triggering event comprises viewer movement to another space.

13. The article of manufacture of claim 10 wherein the additional information comprises a measurement of how long the space was viewed, a number of other links accessed, and an identification of other similar links accessed.

14. The article of manufacture of claim 8 wherein the user related information comprises an address of the user.

15. A web page being displayed on a display device, the web page comprising at least one viewable portion for providing information to a user, the viewable portion being generated by a computable readable medium having instructions for displaying the viewable portion, the instructions further comprising an embedded applet for beginning data gathering upon each access of the accessible code by the user when the accessible code is accessible at a location other than at an originating content server and for returning the gathered data to the originator in response to each access of the accessible code, the execution of the applet and returning of user related information to the originator prevents isolation of the user from the originator of the accessible code.

16. The web page of claim 15 wherein the gathered data comprises information regarding the address of the user.

17. The web page of claim 15 wherein the viewable portion comprises an advertisement.

18. The web page of claim 15 wherein the gathered data further comprises a measurement of how long the space was viewed, a number of other links accessed, and an identification of other similar links accessed.

19. The web page of claim 15 wherein the applet returns the data only after a triggering event occurs.

20. The web page of claim 19 wherein the triggering event comprises closing of data associated with the viewable portion being accessed by the user.

21. The web page of claim 19 wherein the triggering event comprises viewer movement to another space.

* * * * *